United States Patent [19]

Ito et al.

[11] Patent Number: 4,805,513
[45] Date of Patent: Feb. 21, 1989

[54] LAMINATED FRP SOUND BAR FOR PERCUSSIVE MUSICAL INSTRUMENTS

[75] Inventors: Kenji Ito; Ikuji Kurokawa, both of Shizuoka, Japan

[73] Assignee: Yamaha Corp., Japan

[21] Appl. No.: 136,375

[22] Filed: Dec. 22, 1987

[30] Foreign Application Priority Data

Dec. 25, 1986 [JP] Japan .................. 61-313535
Dec. 25, 1986 [JP] Japan .................. 61-313536

[51] Int. Cl.$^4$ .................................... G10D 13/08
[52] U.S. Cl. ............................................. 84/402
[58] Field of Search ................................ 84/402–404

[56] References Cited

U.S. PATENT DOCUMENTS 4,411,187 10/1983 Roper et al. ............... 84/402 R
4,649,791 3/1987 Sawada et al. ............. 84/402 R

FOREIGN PATENT DOCUMENTS 2431151 1/1976 Fed. Rep. of Germany .... 84/402 R

Primary Examiner—Lawrence R. Franklin
Attorney, Agent, or Firm—Ostrolenk, Faber, Gerb & Soffen

[57] ABSTRACT

In construction of a laminated FRP sound bar for percussive musical instrument, isolated pores are formed in FRP components of the lamination in order to raise bonding strength between the adjacent FRP components.

3 Claims, 2 Drawing Sheets

LAMINATED FRP SOUND BAR FOR PERCUSSIVE MUSICAL INSTRUMENTS

BACKGROUND OF THE INVENTION

The present invention relates to a laminated FRP (fiber reinforced plastics) sound bar for percussive musical instruments, and more particularly relates to improvement in the mechanical property of a laminated FRP sound bar used for percussive musical instruments such as xylophones, marimbas and vibraphones.

Conventional use of wood for sound bars is inevitably accompanied with poor uniformity in material quality and seasonal variation in tone quality such as tone colour and tonal pitch.

The use of FRP as a substitute for wood has already been proposed. The invention of Japanese Patent Opening Sho. 59-19997 is one of such proposals. The FRP sound bar of this earlier proposal includes a number of voids elongated in the direction of the fiber orientation in the resin matrix in order to assume characteristic extension of sounds with mild and warm tone colours. In production, fibers or thin rods made of low melting point alloys, thermoplastic resins or thermomeltable materials are dispersed in a resin matrix in the direction of the fiber orientation and the resin matrix is heated to remove these fibers or rods through melting for formation of the above-described voids. This process, however, necessitates multi-staged operational steps which naturally results in high production cost.

In order to overcome this disadvantage, a new type of FRP sound bar was proposed in the US. patent application Ser. No. 736,569 filed on May 21, 1985 (the German patent application P3518032.3 filed on May 20, 1985 and the Dutch patent application No. 8501525 filed on May 29, 1985). The FRP sound bar of this earlier application has a laminated construction in which a number of reinforcing fibers are dispersed in a resin matrix and elongated in the longitudinal direction of the sound bar and a plurality of longitudinal pores are formed and almost uniformly distributed over the entire cross section of the sound bar. In production of such an FRP souud bar, a plate like FRP component is formed by orienting in a resin matrix a number of reinforcing fibers in its longitudinal direction, at least one array of longitudinal grooves are formed in the FRP component, a plurality of FRP components are laminated and bonded together to form a face-to-face combination and a cutout for tonal pitch adjustment is formed in one face of the face-to-face combination.

The use of such a laminated construction simplifies the production process greatly and, as a consequence, reduces the production cost remarkably.

In this laminated construction, one face of one plate like FRP component provided with the grooves is bonded to one flat face of an adjacent plate like FRP component. At bonding of such FRP components, it is highly difficult to coat the flat face with the proper amount of bonding material. Excessive coating partially clogs pores ultimately formed by the grooves to be closed by the flat face, thereby causing inter-pore variation in the vibration characteristics of the sound bar. Whereas insufficient coating lowers the bonding strength between adjacent FRP components, thereby marring uniformity of the product. In addition, the presence of the grooves in one face results in a smaller bonding surface and, as a consequence, low bonding strength between adjacent FRP components. As a result, when the sound bar is beaten during performance in a direction parallel to the faces bonded together, the adjacent FRP components tend to separate from each other, thereby lowering the mechanical strength of the sound bar.

SUMMARY OF THE INVENTION

In accordance with basic aspect of the present invention, a sound bar is made up of a plurality of plate like FRP components laminated and bonded together in a face-to-face combination in which reinforcing fibers are oriented in the longitudinal direction of the sound bar, and each FRP component includes at least one array of isolated pores elongated in the direction of the fiber orientation.

As used herein the term "isolated pore" refers to a longitudinal pore open only at its opposite ends in each FRP component, each pore being separated from the remaining pores.

DESCRIPTION OF THE PREFERRED EMBODIMENTS

Figure 1:
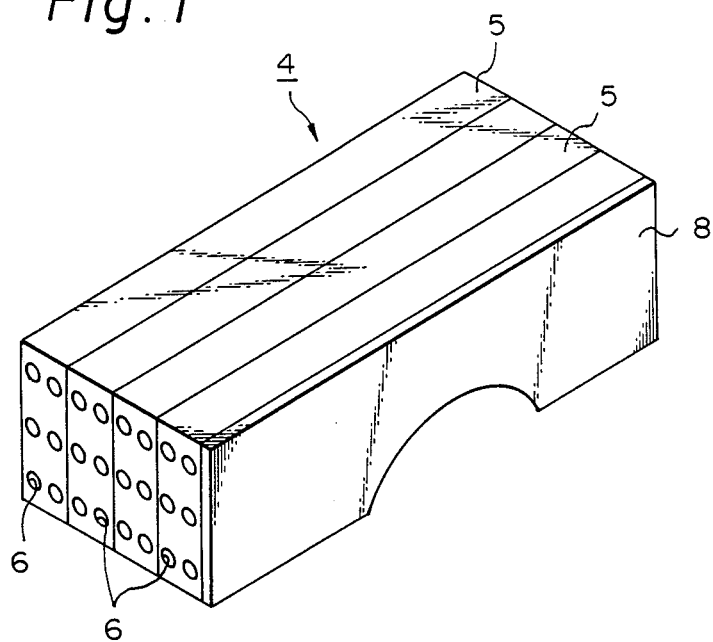
FIG. 1 is a perspective view of one embodiment of the sound bar in accordance with the present invention.

One embodiment of the sound bar in accordance with the present invention is shown in FIG. 1, in which the sound bar 4 is made up of a plurality of plate like FRP components 5 laminated and bonded together in a face-to-face combination. In each FRP component, a number of reinforcing fibers are dispersed in a resin matrix while being oriented in the longitudinal direction of the sound bar 4.

For reinforcement, long fibers such as boron fibers, glass fibers, carbon fibers and aramid fibers are used either individually or in combination. Short fibers such as silicon carbide and boron nitride may also be used either individually or in combination. Long and short fibers may also be mixed. In particular, high elastic carbon fibers are preferably used.

For the matrix, thermosetting resins such as an epoxy resin, unsaturated polyester resin and phenol resin are used. For better adherence to reinforcing fibers, unsaturated polyester resin is preferably used for glass fibers and epoxy resin is preferably used for carbon fibers.

The volume content ratio of the reinforcing fibers with respect to the resin matrix should preferably be in a range from 30 to 70%, and more preferably from 50 to 60%. No sufficient reinforcement is expected when the content ratio fails below 30% and no uniform dispersion of the reinforcing fibers results at any content ratio above 70%. The kind and content ratio of the reinforcing fibers is chosen so that the Young's modulus of the product is 2000 kg/mm$^2$ or larger.

Figure 2:
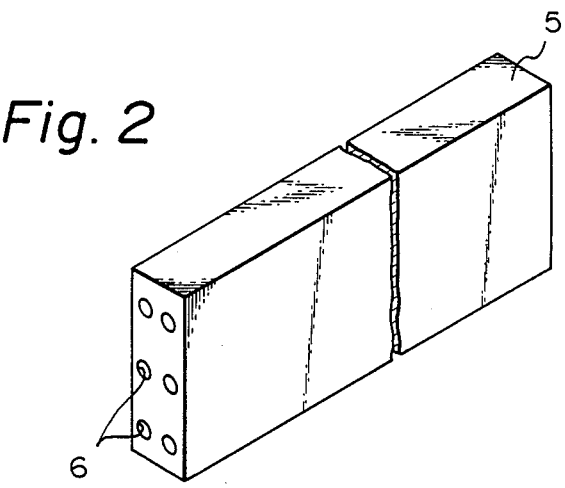
FIG. 2 is a perspective view, partly omitted, of an FRP component used for production of the sound bar shown in FIG. 1.

As shown in FIG. 2, each FRP component 5 is provided with two arrays of isolated pores 6. These isolated pores 6 are elongated substantially in parallel to each other in the direction of the fiber orientation, i.e. the longitudinal direction of the FRP component 5. The cross sectional profile of each isolated pore may be circular, square or any other form. The total cross sectional surface area of the isolated pores should preferably be in a range from 5 to 60% of that of the FRP component 5. The cross sectional surface area and the number of the isolated pores 6 are chosen to arrive at the desired acoustic characteristics of the sound bar 4. When the surface ratio is below 5%, tone colours of sound genrerated lack in woody impression whereas any surface ratio over 60% impairs extension of sounds.

The FRP components 5 are laminated together by bonding. Epoxy resin or resorcinol type bonds are preferably used for lamination because of their high bonding strength and small contraction after solidification. For high rigidity bonding, glass fiber matts and/or carbon fiber matts may be interposed between adjacent FRP components at lamination. A square plate 8 is bonded to one side face of the face-to-face combination for size adjustment of the sound bar 4.

In one typical production of such a sound bar 4, the plate like FRP components 5 are prepared by a drawing operation in which reinforcing fibers are oriented in one direction and, in the oriented state, impregnated with thermosetting resin such as unsaturated polyester resin. Preferably the resin bath should contain 0.5 to 1.5 parts by weight of peroxide hardener such as benzoyl peroxide, lauroyl peroxide and cumene hydroperoxide, and/or 1 to 3 parts by weight of release agent such as zinc stearate, and/or 5 to 50 parts by weight of lubricant such as calcium carbonate, per 100 parts by weight of resin. Next, the resin impregnated combination is passed through a die for formation of the isolated pores 6 in the direction of the fiber orientation, and further through a heating die to form the plate like FRP component 5 shown in FIG. 2. Within the above-described range of the surface ratio, the cross sectional surface area of each isolated pore should, preferably be, as large as possible. The isolated pores 6 can be formed in a machanical manner, too.

Figure 3:
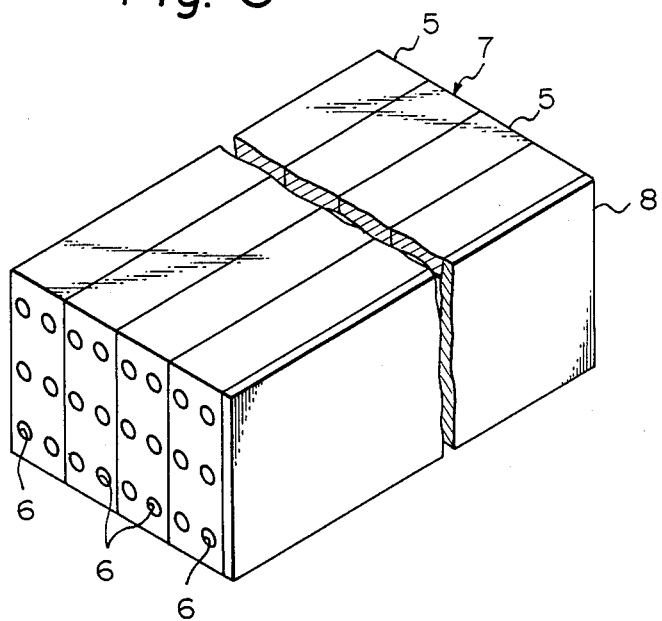
FIG. 3 is a perspective view, partly omitted, of a face-to-face combination to be made into the sound bar shown in FIG. 1.

The FRP components 5 so prepared are laminated and bonded together as shown in FIG. 3 to form a face-to-face combination 7. The direction of lamination is substantially perpendicular to the direction of fiber orientation in each FRP component 5. Thus, the mechanical strength of the FRP component 5 is raised both in the direction of lamination and in the direction of fiber orientation. Thanks to the flatness of the face of the combination 7, the plate 8 can be bonded thereto quite strongly.

Next, a cutout is formed in one side face of the combination 7 to form a sound bar 4 shown in FIG. 1.

Preferably, the sound bar 4 should be beaten at a side face perpendicular to the bonded mating faces of the adjacent FRP components 5. When beaten at a side face parallel to the mating faces, shearing deformation at flexion of the FRP components 5 is concentrated on the bond layers of low elastic nature, thereby impairing extension of sounds generated by the sound bar 4.

Thanks to the isolated construction of the pores 6, the adjacent FRP components 5 are laminated and bonded together via flat mating faces, thereby assuring high bonding strength of the sound bar. In addition, the isolated pores can be formed quite easily by, for example, drawing.

Figure 4:
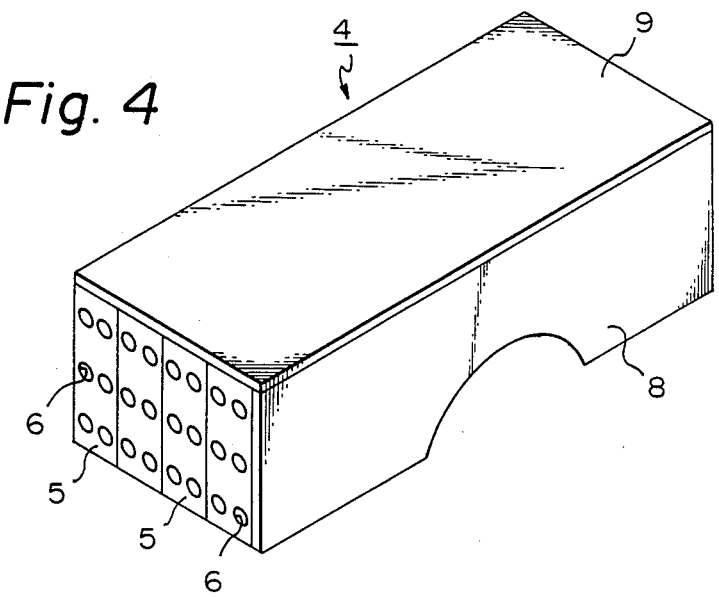
FIG. 4 is a perspective view of another embodiment of the sound bar in accordance with the present invention.

Another embodiment of the sound bar in accordance with the present invention is shown in FIG. 4, in which the FRP plate 9 is additionally bonded to one side face of the face-to-face combination 7 shown in FIG. 3. Reinforcing fibers in the FRP plate 9 may be either oriented in one direction or dispersed in various directions. It is at least required that the FRP plate 9 should contain, at least partially, reinforcing fibers oriented or dispersed in a direction crossing that of the fiber orientation in the FRP components 5. Thanks to the crossing of the fiber orientations, the machanical strength of the sound bar 4 is well raised in both the longitudinal and width directions.

We claim:

1. A laminated FRP sound bar for percussive musical instruments comprising:
   a plurality of plate like FRP components each including at least one generally planar side surface, said FRP components being laminated and bonded together at said side surfaces to form a laminated body in which reinforcing fibers are oriented in the longitudinal direction of said body, each said FRP component including at least one array of isolated pores elongated in the direction of said fiber orientation; and
   a protective plate located on one surface of said body, said surface lying generally perpendicular to said side surfaces.

2. A laminated FRP sound bar as claimed in claim 1 in which said protective plate is an FRP plate.

3. A laminated FRP sound bar as claimed in claim 2 wherein said protective plate at least partially contains reinforcing fibers oriented or dispersed in a direction crossing that of said fiber orientation in said FRP components.

* * * * *